Sept. 10, 1968         M. E. PEW         3,400,499
DRILL GRINDING MACHINE
Filed March 14, 1966                     2 Sheets-Sheet 1

INVENTOR
Melvin E. Pew
BY Polachek & Saulsbury
ATTORNEYS

Sept. 10, 1968  M. E. PEW  3,400,499
DRILL GRINDING MACHINE
Filed March 14, 1966  2 Sheets-Sheet 2
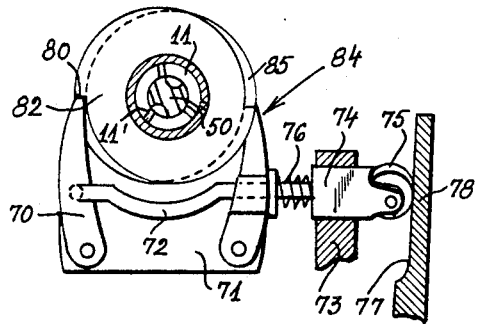
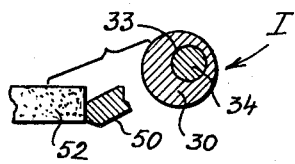
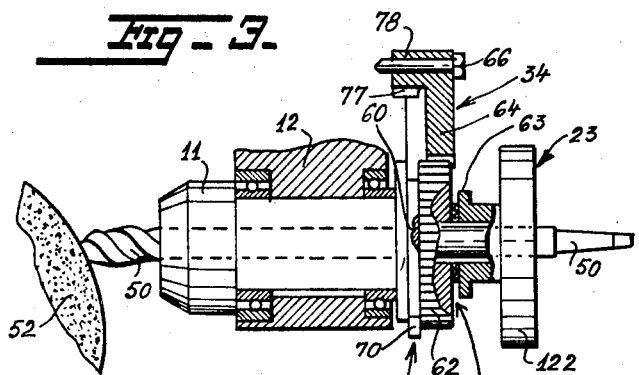
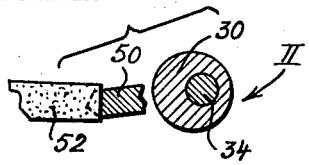
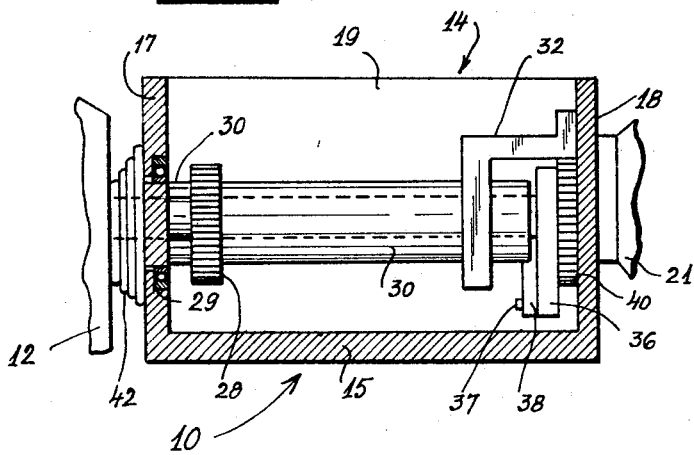
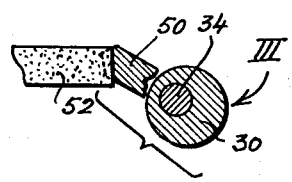
INVENTOR
Melvin E. Pew
BY Polachek & Saulsbury
ATTORNEYS United States Patent Office 3,400,499
Patented Sept. 10, 1968

3,400,499
DRILL GRINDING MACHINE
Melvin E. Pew, 211 Albert St.,
Washington, Ill. 61571
Filed Mar. 14, 1966, Ser. No. 536,183
4 Claims. (Cl. 51—219)

ABSTRACT OF THE DISCLOSURE

A drill grinding fixture that can be used to grind automatically, quickly and accurately the lips on opposite sides of a drill or drill bit. The fixture comprises a box-like, frame with a bracket thereon for supporting a bearing having an eccentric bore. Drive mechanism is provided for rotating the bearing and a shaft in the bore. A chuck housing is movably mounted on the frame as is operatively connected to the shaft so that the housing oscillates and turns angularly in a vertical plane. There is a chuck in the housing for supporting a drill in coaxial disposition, the axis of the drill lying in said vertical plane to present one end of the drill to a grinding wheel while the drill rocks in said plane.

---

Figure 1:
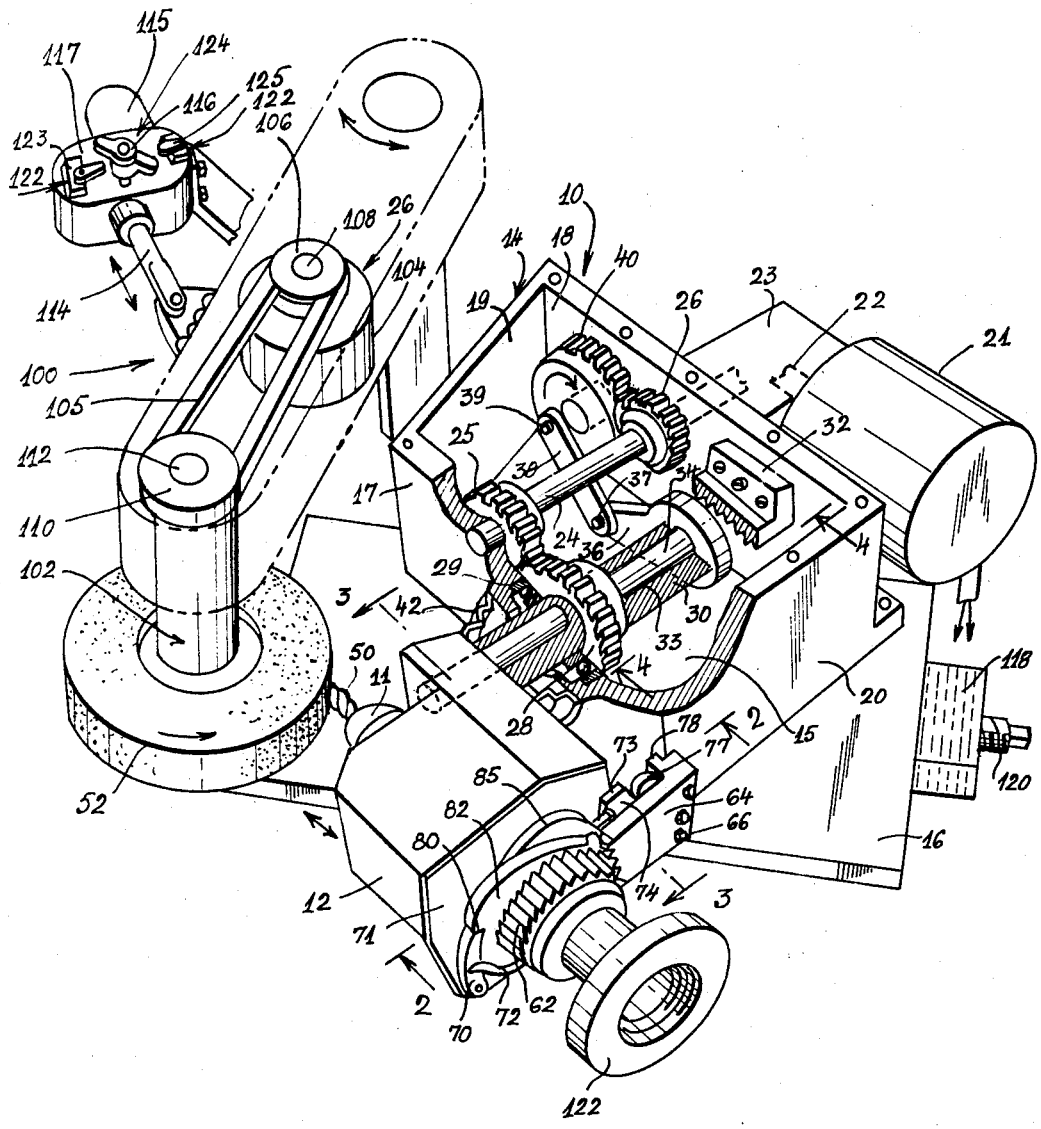

The invention concerns a drill grinding fixture.

The object of the invention is to provide a device which can be used to grind automatically, quickly and accurately the lips on opposite sides of a drill or drill bit.

According to the invention there is provided a fixture including a framework in which is a cylindrical bearing driven by a motor via a great train to rotate continuously. The bearing has an eccentric bore in which is an axially extending shaft. A linkage connects one end of the shaft to the motor via another gear train so that the shaft turns angularly in reciprocating or oscillatory fashion. The bearing rotates while the shaft oscillates, so that the shaft revolves around the axis of the bearing and at the same time the other end of the shaft gyrates in a vertical plane. The other end of the shaft is connected to the chuck housing. The housing rocks up and down while describing an eccentric circular path in a vertical plane. A chuck for supporting a drill to be ground is rotatably carried by the chuck housing. The chuck is kept from rotating by a pawl and cam arrangement which is periodically released once during each complete oscillation or traverse of the chuck housing. The chuck is caused to rotate by a spur gear engaged with a stationary rack gear on the frame. The rotation of the chuck is limited to 180° and takes place the last half of each complete oscillation of the chuck housing, chuck and drill. By this arrangement the drill is fed to a grinding wheel, one lip is ground, the drill is retracted, the drill is rotated 180°, the drill is fed to the grinding wheel again, the other lip is ground, and the drill is again retracted from the grinding wheel to complete grinding of the drill.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a drill grinding assembly including a drill grinding fixture embodying the invention, parts being broken away.

FIGS. 2, 3 and 4 are fragmentary sectional views taken on lines 2—2, 3—3 and 4—4, respectively, of FIG. 1.

FIGS. 5, 6 and 7 are fragmentary sectional views illustrating relative positions of parts at different stages of the operating cycle of the drill grinding fixture.

Referring to the drawings, the drill grinding fixture 10 comprises a rotatable chuck 11 and chuck body 12 arranged to be oscillated and reciprocated simultaneously in a vertical plane. The fixture includes a box-like frame 14 which is rather trapezoidal in plan view. The frame is mounted on a horizontal plate 16.

Frame 14 has a bottom wall 15 integral with parallel front and rear walls 17, 18 joined by vertical end walls 19, 20. A motor 21 is mounted at the rear side of rear wall 18. This motor has a shaft 22 connected via a speed reducer mechanism 23 to a shaft 24 which is rotatably journaled between walls 17, 18 in an axially horizontal position. Shaft 24 carries a spur gear 25 at its front end and a spur gear 26 at its rear end. Gear 25 engages gear 28 to which is joined a horizontal cylindrical bearing 30. Bearing 30 is rotated by driving gear 28 and is rotatably supported on one end by a roller bearing in bracket 32 secured to the front side of wall 18. The other end of bearing 30 is supported by another roller bearing 29 in wall 17, see FIG. 4.

Bearing 30 has an eccentrically disposed axial bore 33 through which extends a rotatable shaft 34. At its rear end shaft 34 is joined to and supports a lever 36 pivotally connected by pin 37 to a link 38. Link 38 is pivotally connected by pin 39 to a gear 40 meshed with and driven by gear 26. The link 38 operates in scissors fashion with lever 36 to angularly oscillate shaft 34. Since bearing 30 is rotated in its stationary support by gear 25, shaft 34 revolves laterally around the axis of bearing 30 and at the same time shaft 34 is oscillated rotationally by the linkage 36, 38.

A flexible rubber bellows 42 is connected to the front side of wall 17 and the chuck body 12 to eliminate Emery grit getting into the bearings in wall 17 and bearing 30.

The shaft 34 extends through wall 17 and is connected to the chuck body 12. By this arrangement the chuck body can be caused to oscillate and reciprocate in a vertical plane passing through the axis of the chuck 11.

The fixture has an indexing mechanism for controlling rotation of chuck 11 which carries drill 50 to be ground by grinding wheel 52. The mechanism accomplishes feeding, grinding and retracting steps in the drill grinding cycle or sequence. This mechanism shown in FIGS. 1-3, includes a slip clutch 60 which comprises gear 62 and an abutting friction disk 63 on each side of gear 62. Gear 62 is engaged with a stationary rack gear 64 secured by bolts 66 to the outer side of end wall 20. The gear rack 64 extends forwardly of wall 17 as clearly shown in FIG. 1. Gear 62 is turned under control of a cam actuated one-way clutch 68. Gear 62 is operatively connected to chuck 11, and causes successive half turns or 180° angular rotations of drill 50 during each upward movement of chuck 11.

Clutch 68 includes a pawl 70 pivotally mounted on the other end 71 of the chuck body 12; see FIG. 2. Connected to the pawl 70 is a plunger 72 carried by a cam follower 74 slidable in bracket 73. The cam follower carries a roller 75 and is biased by a coil spring 76 against a cam surface 77 defined by a flange 78 formed at one end of the rack gear 64. Pawl 70 is engaged with a step 80 formed on a cam 82 forming part of clutch 68. The pawl is released from the cam step 80 during the last inch of downward travel of the clutch body, then chuck 11 with drill 50 is rotated 180°, on the upward travel of the clutch body. A second spring biased pawl 84 is in continual contact with a step in a second cam 85 reversed with respect to cam 82 and serves to prevent reverse rotation clutch 68.

The assembly includes an associated grinder 100 having grinding wheel 52 carried by a grinder head 102. The grinding wheel is driven by a motor 104, and drive belt 105. The drive belt is engaged with pulley 106 on the drive shaft 108 of the motor and pulley 110 on shaft 112 of the grinder head 102. The grinder may be provided with a feeder linkage 114 actuated by a motor 115. The linkage is locked in position by pawl and ratchet 117, after the grinding position of the grinding wheel is set up for grinding any particular amount of stock from end of drill. A cam 124 driven by motor 115 pushes feeder linkage 114 for automatic feed. At end of feed stroke, the lever 116 sets of limit switches 123 and 125 which stops motors 115, 104 and 21.

The entire fixture including plate 16 is mounted on a table (not shown). The fixture 10 and plate 16 can be adjustably positioned on the table by means of hand cranking screw shaft 120 engaged with the plate 16.

To operate the assembly, a drill 50 to be ground at its forward end is inserted in chuck 11 and engaged by collets 11' which are tightened by means of knurled knob 122. The grinder head 102 is then advanced by turning knob 116 by hand advancing feeder linkage 114 to proper position for presenting the cylindrical periphery of the grinding wheel 52 to the lips at the tip of drill 50. Then motor 115 automatically rotates ratchet cam causing feeder linkage 114 to advance head 102 and wheel 52 into drill tip.

FIGS. 5, 6 and 7 illustrate steps in the grinding sesuence which takes place when motor 21 is started. These figures actually illustrate only one stroke or one half of the full grinding procedure during which the drill 50 is fed or presented to the wheel in step I of FIG. 5, ground in step II of FIG. 6 and retraction of the ground drill is begun in step III of FIG. 7. These movements are accomplished during rotation of bearing 30 while shaft 34 revolves around the axis of bearing 30. The shaft 34 does not rotate fully on its own axis but only oscillates through an angle determined by the arrangement of the lever 36 and link 38. The entire clutch body oscillates and reciprocates in a vertical plane in which lie the registering axes of the drill and chuck. After one full grinding stroke is completed at one lip of the drill, pawl 70 becomes disengaged from step 80 of cam 82 and pawl 84 becomes disengaged from cam 85 to permit the chuck and drill to rotate 180° and grind the opposite lip of the drill. As soon as the drill has rotated 180° pawl 70 reengages with cam 82, and pawl 84 reengages with cam 85.

By the arrangement described, the drill is quickly, accurately and automatically ground. The procedure requires no manual adjustments once grinding has been started. The entire sequence proceeds automatically. The synchronized oscillating reciprocating movement produced by the indexing function of linkages 36, 38 and gyration effected by rotating bearing 30 results in the three basic steps or stages (feed, grind and retract) which occur during each stroke of the drill grinding sequence.

While I have illustrated and described the preferred embodiments of my invention, it is to be understood that I do not limit myself to the precise construction herein disclosed and that various changes and modifications may be made within the scope of the invention as defined in the appended claims.

What is clamed is:

1. A drill grinding fixture, comprising a box-like frame, a bearing bracket carried by said frame, a cylindrical bearing rotatably carried by said bracket, said bearing having an eccentric axial bore, a rotatable shaft extending axially through said bore, a drive mechanism in said frame operatively engaged with said bearing to rotate the same and to oscillate the shaft angularly, a chuck, housing, flexible mounting means connecting said chuck housing to said frame so that the chuck housing is movable with respect to the frame, said shaft having one end connected to said chuck housing so that the housing oscillates and turns angularly in a vertical plane, and a chuck carried by said housing for supporting a drill in coaxial disposition, the axis of the drill lying in said vertical plane to present one end of said drill to a grinding wheel while the drill rocks in said plane, said mechanism comprising a motor, a drive shaft extending through said frame and operatively driven by said motor, a first gear on the drive shaft, a second gear secured to said bearing and meshed with the first gear so that the bearing rotates when the motor is running, a third gear carried by said drive shaft, a fourth gear rotatably carried by said frame and meshed with the third gear, a link pivotally connected to the fourth gear, and a lever pivotally connected to the link and secured to the first named shaft, so the first named shaft oscillates rotationally while revolving around the axis of the bearing to rock the drill in said vertical plane.

2. A drill grinding fixture as recited in claim 1, further comprising another mechanism mounted on said frame and operatively connected to said chuck to rotate the same 180° each time the chuck housing, chuck and drill complete an up and down rocking stroke involving one complete oscillation of the drill in said vertical plane.

3. A drill grinding fixture as recited in claim 2, wherein said other mechanism comprises a rack gear connected to said frame, a spur gear operatively engaged with said chuck and meshed with said rack gear to rotate the chuck 180° once during each complete oscillation of the chuck housing, a cam engaged with said chuck coaxially therewith, a pawl pivotally mounted on said chuck housing and engaged with said cam to permit 180° rotation of the chuck once during each complete oscillation of the chuck housing, a flange at one end of the rack gear, said flange having a camming surface, a cam follower movably engaged with said camming surface, and a plunger connected to said pawl to release the same from the cam, said plunger being connected to the cam follower for actuation thereby once during each complete oscillation of the chuck housing, so that the chuck turns on its axis 180° with respect to the rack gear due to oscillatory movement of the chuck housing in said vertical plane at a certain point in the oscillation of the chuck housing, whereby lips on opposite sides of said end of the drill are ground in succession.

4. A drill grinding fixture as recited in claim 1, further comprising a rack gear connected to said frame, a spur gear mechanism comprises a rack gear connected to said frame, a spur gear operatively engaged with said chuck and meshed with said rack gear to rotate the chuck 180° once during each complete oscillation of the chuck housing, a cam engaged with said chuck coaxially therewith, a pawl pivotally mounted on said chuck housing and engaged with said cam to permit 180° rotation of the chuck once during each complete oscillation of the chuck housing, a flange at one end of the rack gear, said flange having a camming surface, a cam follower movably engaged with said camming surface, and a plunger connected to said pawl to release the same from the cam, said plunger being connected to the cam follower for actuation thereby once during each complete oscillation of the chuck housing, so that the chuck turns on its axis 180° with respect to the rack gear due to oscillatory movement of the chuck housing in said vertical plane at a certain point in the oscillation of the chuck housing, whereby lips on oppposite sides of said end of the drill are ground in succession.

References Cited

UNITED STATES PATENTS 327,758   10/1885   Birkenhead _____ 51—219

FOREIGN PATENTS 352,263   5/1922   Germany.

HAROLD D. WHITEHEAD, *Primary Examiner.*